United States Patent
Swanson et al.

(10) Patent No.: US 7,389,409 B2
(45) Date of Patent: Jun. 17, 2008

(54) ELECTRONIC DEVICE CONFIGURATION MANAGEMENT SYSTEMS AND METHODS

(75) Inventors: Sheldon Keith John Swanson, Ottawa (CA); Kenneth Glenn MacQueen, Merrickville (CA); Joseph Soetemans, Nepean (CA); Tim Kuhl, Kanata (CA); Wayne Wall, Stittsville (CA)

(73) Assignee: Alcatel Lucent, Paris (FR)

( * ) Notice: Subject to any disclaimer, the term of this patent is extended or adjusted under 35 U.S.C. 154(b) by 400 days.

(21) Appl. No.: 11/119,005

(22) Filed: Apr. 29, 2005

(65) Prior Publication Data

US 2006/0248329 A1    Nov. 2, 2006

(51) Int. Cl.
*G06F 15/177* (2006.01)

(52) U.S. Cl. .......................................... 713/1; 709/223

(58) Field of Classification Search ................ 713/1; 709/223
See application file for complete search history.

(56) References Cited

U.S. PATENT DOCUMENTS

| | | | |
|---|---|---|---|
| 6,769,053 B1 * | 7/2004 | De Jong et al. ............ 711/156 |
| 2001/0044935 A1 * | 11/2001 | Kitayama ..................... 717/11 |
| 2002/0184410 A1 * | 12/2002 | Apel et al. ...................... 710/5 |
| 2003/0140134 A1 * | 7/2003 | Swanson et al. ............. 709/223 |
| 2004/0186690 A1 | 9/2004 | Swanson et al. |
| 2005/0055575 A1 * | 3/2005 | Evans et al. .................. 713/201 |

* cited by examiner

*Primary Examiner*—Thomas Lee
*Assistant Examiner*—Vincent T Tran
(74) *Attorney, Agent, or Firm*—Kirk D. Houser; Arnold B. Silverman; Eckert Seamans Cherin & Mellott, LLC (57) ABSTRACT

Electronic device configuration management systems and methods are disclosed. Configuration information for configuring at least one component of an electronic device is stored in a memory. A determination is made as to whether further configuration information capable of configuring the at least one component is available at the electronic device. Based on the determination, one of the configuration information and the further configuration information is loaded to configure the at least one component. The determination may be made, for example, by accessing compatibility information which is associated with the configuration information. Data structures supporting configuration management functions are also disclosed.

17 Claims, 4 Drawing Sheets

ELECTRONIC DEVICE CONFIGURATION MANAGEMENT SYSTEMS AND METHODS

FIELD OF THE INVENTION

This invention relates generally to electronic devices and, in particular, to managing configurations of electronic devices.

BACKGROUND

Electronic devices such as communication devices often incorporate hardware, software, and firmware which cooperate to support device functions. Common hardware components include processors such as Central Processing Units (CPUs), Field Programmable Gate Arrays (FPGAs), Programmable Logic Devices (PLDs), and memory devices, for example. Firmware generally refers to low-level, executable code which controls basic functions of hardware, and may be stored in various types of memory device, including Erasable Programmable Read Only Memory (EPROM), Electrically Erasable PROM (EEPROM), Random Access Memory (RAM) for instance, or effectively embedded into the hardware devices it controls, as in the case of FPGAs and PLDs. Higher-level functions are normally supported in software. Software is normally stored in non-volatile memory, and loaded into volatile memory, illustratively RAM, for execution. Operating system code and software applications represent illustrative examples of software.

A hardware change may be necessary for an electronic device due to a specification change for a particular component, cost reduction reworking of the device, component obsolescence, etc. Hardware changes can present an operations and maintenance problem when a change also necessitates a software or firmware change. This situation may be particularly problematic where an electronic device is an electronic circuit card in communication equipment or part of some other widely deployed electronic system. An enterprise which operates many systems in which particular circuit cards are used and kept as spares may wish to standardize its systems to a given specific version of hardware, software, and firmware. For example, telecommunications service providers typically have this requirement, as do other organizations which require reliable communication or computing networks, including banks, utilities, hospitals, etc.

U.S. patent applications Ser. No. 10/252,703, entitled "SYSTEM AND METHOD FOR MANAGING CONFIGURABLE ELEMENTS OF DEVICES IN A NETWORK ELEMENT AND A NETWORK", filed on Sep. 24, 2002, and published on Jul. 24, 2003 with Publication No. 2003/0140134, and Ser. No. 10/392,867, entitled "SYSTEM AND METHOD FOR TRACKING ENGINEERING CHANGES RELATING TO A CIRCUIT CARD", filed on Mar. 21, 2003, and published on Sep. 23, 2004 with Publication No. 2004/0186690, describe systems and methods for tracking the compatibility of various versions of hardware, software, and firmware associated with an electronic device or a system of electronic devices.

According to the compatibility tracking mechanisms described in the above applications, software and firmware which are compatible with particular hardware are identified and loaded into an electronic device. In the event that compatible software and firmware are not available on the device, new software and firmware may be downloaded from a remote location. Thus, hardware changes which are not fully compatible with previous versions of software and firmware may result in new software and firmware loads.

One disadvantage of distributing separate software and firmware upgrade files for new hardware is that customers must then separately apply patches or new software and firmware, which increases the number of aspects of hardware upgrades which are managed by a customer. Separate software and firmware upgrades also complicate efforts to standardize software for use in all electronic devices operated by an enterprise. Releasing a new application load to customers who have standardized on a previous release, for instance, would involve the customer re-deploying a new load standard. This additional level of upgrade complexity may tend to make customers reluctant to upgrade hardware.

In addition, manufacturers typically cannot ship hardware until they ensure that it works with software. If a new application load is required for new hardware, then this dependence on software may create operations slow-downs until the new application load is qualified. For example, if a new application load is required for a cost reduction hardware change, then the hardware change could not normally be made until the majority of the customer base has moved to a minimum software version that supports the new hardware. This often takes several years after the first software load which supports the cost reduced hardware has been made available to customers.

There are also cases in which there would be significant cost associated with a customer moving to a new application load standard. Customers must often validate a new load before allowing it to be used on in-service equipment. Validation time can range widely, from no validation at all to several months or even a year of test coverage. This may make some customers very reluctant to take new loads without an associated business case, such as where a new load provides no new functionality and thus no new revenue potential.

According to other approaches, complex product numbering schemes are used to ensure that customers order a specific hardware product and matching software/firmware. Clearly, this would be complex to establish, deploy, and maintain. For example, where a cost reduction plan on a product A results in a new version product A2 which requires slightly different firmware, customers, including former purchasers of product A, would need to explicitly order product A2 and corresponding software/firmware A2.

Thus, there remains a need for improved techniques for managing electronic devices and their configuration, through software and/or firmware, for example.

SUMMARY OF THE INVENTION

Embodiments of the invention provide a mechanism whereby an electronically upgradeable component, illustratively software or firmware, which is used to configure an electronic device, can be adjusted without having to re-release that component. According to a particular embodiment, the invention provides for automatic discovery of firmware patches when new hardware is released, and also maintains full backwards compatibility with older application software.

According to one aspect of the invention, there is provided an apparatus for managing configuration of an electronic device. The apparatus includes a configuration information loader which is adapted to access a memory storing configuration information for configuring at least one component of an electronic device, to determine whether further configuration information capable of configuring the at least one component is available at the electronic device, and to load one of the configuration information and the further configuration information, based on the determination, to configure the at least one component.

The configuration information loader may be implemented, for instance, in software for execution by a processor.

In some embodiments, the memory further stores compatibility information identifying a version of the configuration information. In this case, the configuration information loader determines whether further configuration information capable of configuring the at least one component is available at the electronic device by determining whether the identified version or a higher version of the configuration information is available at the electronic device. The configuration information loader may be further adapted to access a predetermined storage location of either the memory or a further memory, the predetermined storage location storing an indication of a storage location in the memory at which the configuration information is stored.

The configuration information may include firmware, software, or both. According to one embodiment, the configuration information includes firmware and/or software bundled with hardware of the electronic device, and the configuration information loader determines whether further configuration information capable of configuring the at least one component is available at the electronic device by identifying any application loads which are available at the electronic device, each application load including software and firmware.

The configuration information loader may load the configuration information where further configuration information is not available at the electronic device, and load the further configuration information where further configuration information is available at the electronic device.

A version of compatibility information associated with the configuration information may be compared with a version of compatibility information associated with the further configuration information by the configuration information loader to determine whether further configuration information capable of configuring the at least one component is available at the electronic device.

The apparatus may be implemented, for example, in an electronic circuit card of communication equipment, the communication equipment also including respective memory areas for storing the configuration information and an application load including further configuration information A method of managing configuration of an electronic device is also provided, and includes detecting configuration information, stored in a memory, for configuring at least one component of the electronic device, determining whether further configuration information capable of configuring the at least one component is available at the electronic device, and loading one of the configuration information and the further configuration, based on the determining, to configure the at least one component.

Various techniques may be implemented for performing these operations. Methods according to embodiments of the invention may also include additional operations. These techniques and additional operations may include, for example, the apparatus functions described above.

A further aspect of the invention provides a machine-readable medium storing a data structure. The data structure includes configuration information for configuring at least one component of an electronic device, and compatibility information associated with the at least one file, the compatibility information allowing a determination to be subsequently made as to whether further configuration information available at the electronic device is capable of configuring the at least one component.

In some embodiments, the configuration information includes at least one file. Each file has a data section including at least a portion of the configuration information, and a header section including at least one of: a tag for use in validating the header section as a header section of a file, version information for use in determining whether the file is compatible with current electronic device software, an indication of data section size, a file name, and file integrity information for use in detecting corruption of the file.

The compatibility information may include version information, indicating a version of the compatibility information, for comparison with version information of further compatibility information associated with the further configuration information.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

As described briefly above, modern day digital equipment is generally made up of physical hardware, including hardware parts which are electronically programmed using firmware, and software, often in the form of a software application load which runs on the hardware and/or the programmed hardware parts. Thus, both firmware and software configure an electronic device for operation. The firmware configures low-level functions of specific hardware components, and the software further configures a device in the sense that execution of the software causes the device to operate in a particular manner.

Firmware is usually either distributed with the hardware at the time of production, with updates available as separate, electronically distributable files which can be downloaded into the hardware, or embedded in a software application load. It tends to be a complex problem to ensure that hardware, firmware, and software are compatible throughout the entire life of a product. Various product management approaches intended to address this problem have been described above.

Embodiments of the present invention offer improved techniques for managing electronic devices and their configurations. According to one embodiment disclosed in further detail herein, compatibility information is stored on, or at least accessible from, an electronic device, and used to manage firmware and software patches. The compatibility information, illustratively formatted as a matrix, provides the capability to determine compatibility of configuration information, which may include firmware, software, or both. The compatibility information and configuration information may be stored in memory, preferably non-volatile memory such as Flash or Serially Electrically Erasable PROM (SEEP), of the electronic device being configured or a different device.

In one particular embodiment, configuration management functionality is provided through the use of a patch area pointer, which points to a section of memory where the compatibility information and configuration information are stored. Both the compatibility information and the configuration information are preferably updated on each new version of an electronic device to support hardware changes incorporated into that version of the device. Application software then accesses the patch area pointer, on device power-up for instance, and loads any required firmware or software patches according to the compatibility information, thereby enabling a new hardware version of the device to be used with older software loads.

Configuration information could be stored at the same address on all cards in a new product, and thus the patch area pointer could effectively be hardcoded. A patch area pointer stored in memory may be preferred, however, to provide for flexibility in future hardware and software. For example, a hardware cost reduction might entail reducing an amount of Flash on an electronic device or implementing larger and cheaper FPGAs which might necessitate adding more Flash to store firmware. A configuration information loader could then be stored in an unused portion of memory, such as an unused portion of boot PROM or an unused portion of the Flash. Hardcoding a patch area pointer for use by the loader could be feasible if the electronic device has plenty of Flash, but this is not always the case. With a patch area pointer stored in memory, future hardware changes to add a new Flash in unused portions of the memory map for example, are more easily supported.

New hardware issues may be identified after a version of an electronic device has been released. In this case, updated configuration information which includes fixes for these hardware issues may be included in newer software loads which are released after the electronic device. According to some embodiments of the invention, newer configuration in a software load supersedes older configuration information stored on the electronic device.

Figure 1:
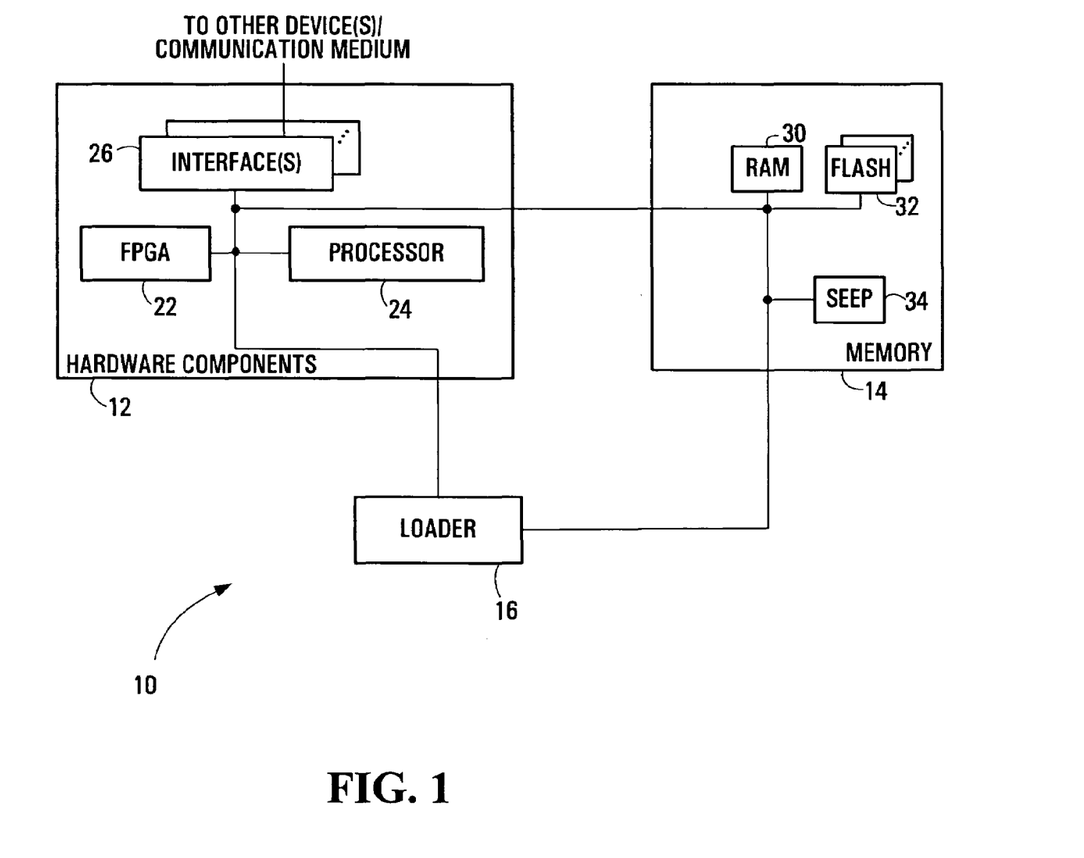
FIG. 1 is a block diagram of an electronic device incorporating an embodiment of the invention.

FIG. 1 is a block diagram of an electronic device incorporating an embodiment of the invention. The electronic device 10 includes hardware components generally designated 12, a memory 14, and a configuration information loader 16. The hardware components 12 are operatively coupled to the memory 14, through an internal bus structure, for example. The loader 16 is operatively coupled to both the hardware components 12 and the memory 14. Where the loader 16 is implemented in hardware, the interconnections between the loader 16, the components 12, and the memory 14 may also be through an internal bus. In software-based implementations of the loader 16, functions of the loader 16 are performed by a processor, illustratively the processor 24.

It should be appreciated that embodiments of the present invention are applicable to many different types of electronic device, and accordingly, an electronic device may incorporate, fewer, additional, or somewhat different components with different interconnnections than those explicitly shown in FIG. 1. As will become apparent from the following description, the loader 16 is primarily responsible for managing configuration of the electronic device 10. The types and number of the other components shown in FIG. 1 may vary between different electronic devices and the systems in which they are implemented.

FIG. 1, as well as the contents of the other drawings, are thus intended solely for illustrative purposes. The present invention is in no way limited to the specific example embodiments shown in the drawings and described herein.

The hardware components 12 of the electronic device 10 include configurable components such as an FPGA 22 and a processor 24. The FPGA 22 is an example of a component which is configurable by firmware, whereas the processor 24, illustratively a microprocessor, application specific integrated circuit (ASIC), or digital signal processor (DSP) for instance, represents a component which is configurable to perform functions by executing software. Although not explicitly shown in FIG. 1, the electronic device 10 may also include other configurable hardware components such as PLDs, and/or physical hardware components, such as resistors, which are not generally configurable.

One or more interfaces 26 are preferably provided in the electronic device 10 to support interaction with other electronic devices through a communication medium. For example, new application loads may be distributed to the electronic device 10 from a remote source through the interface 26. In a communication device, an interface 26 enables communication to be established with other devices or systems, often through a communication network.

The memory 14 represents data storage which may include one or more memory devices, such as solid state memory devices, disk drives, and/or other types of memory device adapted for operation with fixed or removable storage media. In FIG. 1, the RAM 30, one or more banks of Flash memory 32, and the SEEP 34 are shown as illustrative examples of different types of memory device which are often incorporated into electronic devices. Normally, application software is stored in two banks of the Flash 32, one of which is active at any time, and loaded into the RAM 30 for execution by the processor 24. The SEEP 34 is often used to store initialization and other control information for use by software. According to an embodiment of the invention, the SEEP 34 is used to store a pointer to configuration information for configuring one or more of the hardware components 12.

Although the memory 14 is shown in FIG. 1 as being part of the electronic device 10, externally stored information may be accessed by the loader 16 in some embodiments. Shared memory such as a Storage Area Network (SAN) disk or a server, for example, may be used to store configuration and/or compatibility information used in managing configuration of the electronic device 10. Other possible types of memory suitable for storing compatibility and configuration information will be apparent to those skilled in the art.

In one embodiment, the loader 16 is implemented in software, as part of an application load stored in the Flash banks 32. The loader 16 is executed by the processor 24 and functions as described in further detail below. In this case, the loader 16 is effectively part of the processor 24.

Those skilled in the art will be familiar with many types of electronic device having a general structure similar to the electronic device 10, with the exception of a loader 16 which operates in accordance with embodiments of the invention. Mobile telephones and other communication devices, for example, have interfaces to communication networks, in the form of transceivers, additional configurable and non-configurable hardware components, and memory devices. Communication devices are often sold to consumers and later configured by downloading configuration information, illustratively software and/or firmware. As old versions software and firmware might be downloaded to new communication devices with which they are not compatible, the techniques described herein may be particularly useful in conjunction with communication devices.

A circuit card in electronic equipment is another example of an electronic device for which the techniques disclosed herein may be useful. In communication equipment, for example, line cards provide interfaces to communication media and operate in conjunction with a control card and possibly other circuit cards. Configuration information updates for the communication equipment, including the line cards, may be received by the control card and loaded by the line cards from the control card. The above-referenced patent applications, the entire contents of both of which are hereby incorporated by reference into the present application, describe techniques for tracking hardware, firmware, and software compatibility in this type of equipment.

In operation, the loader 16 controls loading of configuration information to configure the electronic device 10, or particular components thereof. According to an embodiment of the invention, compatibility information and configuration information are stored in the memory 14, illustratively in a reserved area of the Flash 32. The compatibility information may include an identifier or description of the electronic device 10 and/or its configurable hardware components, an indication of its software compatibilities, and an indication of configuration information, such as file names and version information of specific firmware files for instance, for use in properly configuring the electronic device 10. The configuration information identified in the compatibility information is also preferably stored in the Flash 32.

The compatibility and configuration information is preferably loaded into the Flash 32 at the time of manufacture of the electronic device 10, and bundled or distributed along with the electronic device 10.

In this manner, when hardware changes are made in a new version of the electronic device 10 which needs new firmware or a software patch, for example, compatibility information and configuration information, including new firmware and/or software patches in this case, is stored in the memory 14 and thereby bundled with the electronic device 10. It should be noted that this configuration information is independent of an application software load, which would also normally be stored in the Flash 32 as described above.

According to one embodiment, an indication of the storage location of the compatibility and configuration information in the Flash 32 is stored in a predefined area of the SEEP 34. As the compatibility and configuration information may span more than one addressable storage location in the Flash 32, the storage location identified in the SEEP 34 may be a storage location at which the compatibility and configuration information begins. This storage location, like the information in the Flash 32, is preferably programmed into the SEEP 34 during manufacturing of the electronic device 10.

The storage location in the Flash 32 may be identified in the SEEP 34 by an absolute address, although a pointer, illustratively an offset from a base address of the Flash 32, may be preferred. The absolute address of information in the Flash 32 may change depending upon the version of software, hardware, or the particular components implemented in the electronic device 10. The use of a generic pointer stored in the SEEP 34 does not dedicate the compatibility and configuration information to the same storage location on all electronic devices, or to a storage location which is pre-defined in software. A pointer also allows compatibility and configuration information to be stored in boot Flash (not shown) or in a separate memory area of the Flash 32, as desired, thereby avoiding strict design requirements on the electronic device 10. It should also be appreciated that compatibility and configuration information could be stored externally of the electronic device 10, at a server for instance.

Where a customer has standardized to a particular version of a software application, it is generally desirable to continue to use that application version with new versions of an electronic device. However, firmware bundled with an older version of the application might not be capable of configuring certain components in a new version of hardware.

According to an embodiment of the invention, the loader 16, which may be provided as part of an application load and executed when the software application in the application load is first started, for example, is programmed to access the SEEP 34 to determine where in the Flash 32 the compatibility and configuration information is stored. The loader 16 then accesses the Flash 32 to determine configuration information, i.e., firmware and/or software, requirements for the electronic device 10.

Where a customer has standardized to a particular version of a software application for the electronic device 10 and a loader is distributed to the electronic device 10 as part of an application load, several loader scenarios are possible. The loader in an older application load which includes the standardized version of the software application may or may not include the configuration management functionality disclosed herein. In the former case, the older application load may simply be distributed to the electronic device 10 to configure the device for operation. Otherwise, a new application load incorporating the standardized software application and a new loader may be prepared and distributed to the electronic device 10. Although the new application load would include a new loader, the standardized software application need not be changed. Thus, a customer may continue to use a standardized software application on new electronic devices. Another possible option for distributing a new loader would be to store the loader in memory on a device when the device is manufactured.

When the loader 16 has determined the configuration information which should be used to configure the electronic device 10, it preferably reconciles any new configuration requirements with other configuration information which is available on the electronic device 10 and also capable of suitably configuring the electronic device 10. In one embodiment, this involves identifying any application loads available at the electronic device 10. For example, after an electronic device 10 has been deployed, new application loads including updated firmware may be distributed. In this case, the updated firmware may be capable of configuring the electronic device 10 and used instead of firmware which was originally bundled with the electronic device 10. Otherwise, if the firmware bundled with the application load cannot configure the electronic device or a component thereof, then the hardware-bundled firmware is selected by the loader 16.

The loader 16 then uploads and applies configuration information, which may include new firmware and/or new software, in the form of complete firmware or software or patches for updating firmware or software patches, to configure the electronic device 10. As will be apparent from the foregoing, configuration information used to configure the electronic device 10 may include hardware-bundled information, software-bundled information, or some combination thereof.

The specific operations involved in uploading and applying configuration information may be dependent upon the type of configuration information and the components being configured. Whereas the loader 16 may cause new firmware for configuring the FPGA 22 to be applied directly to the FPGA 22, using Joint Test Action Group (JTAG) techniques for instance, new software would instead modify the contents of the Flash 32 and/or the RAM 30. Patching the RAM image of software may be preferred over updating Flash, as a RAM image patching would generally be a safer approach. Further or different operations which may be performed to configure the electronic device 10 will be apparent to those skilled in the art.

An older application load is thus able to run on new hardware, without requiring the customer to manually receive and apply upgrade files or switch to a new software application.

Figure 2:
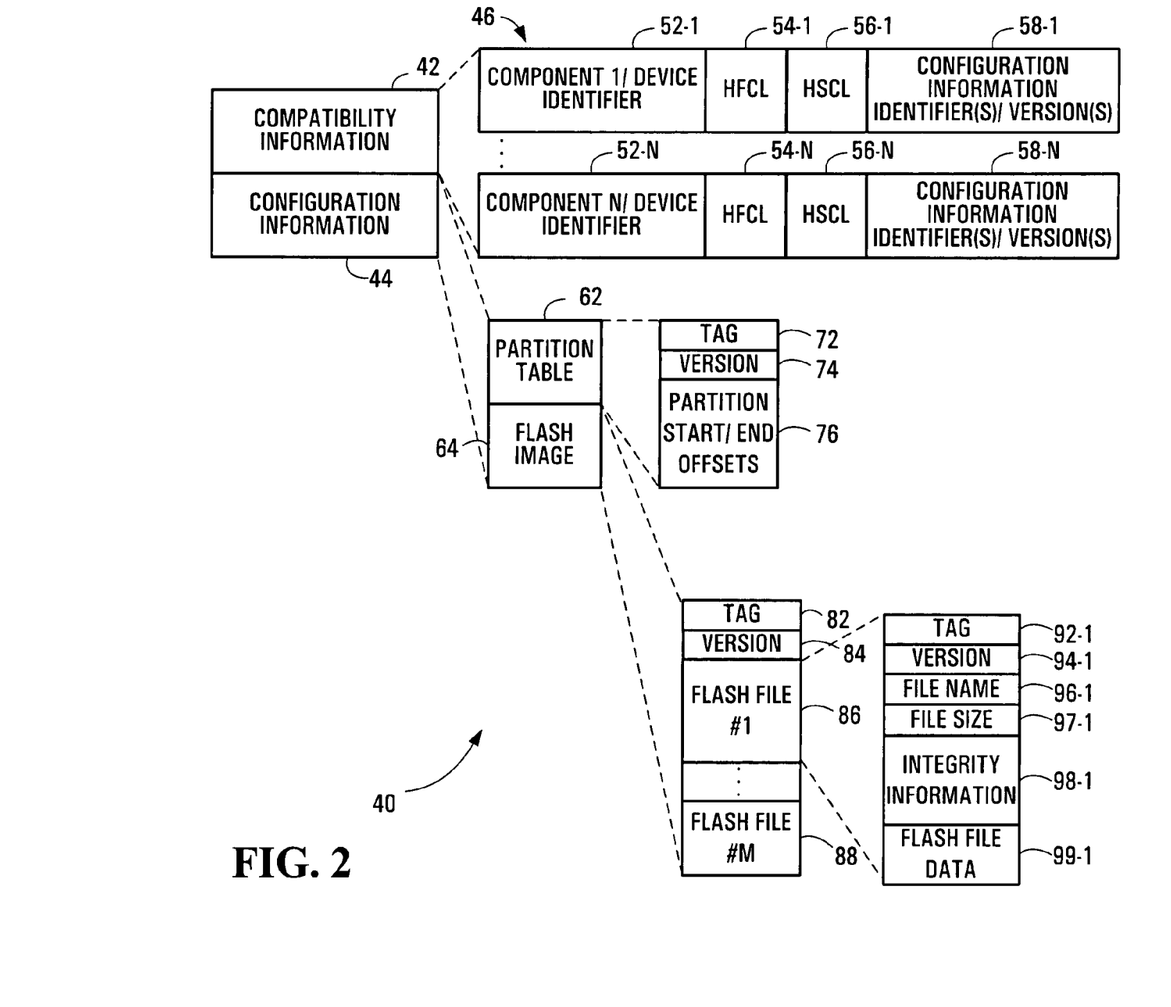
FIG. 2 is a block diagram of a data structure in accordance with an embodiment of the invention.

Any of many different data structures may be used to manage configuration of an electronic device as disclosed herein. FIG. 2 is a block diagram of one possible data structure.

The data structure 40 of FIG. 2 includes compatibility information 42 and configuration information 44, which are bundled and distributed with an electronic device and also an application load. The compatibility information includes one or more records 46, in the form of N rows of a table or matrix. Each $n^{th}$ record or row (n=1, ..., N) incorporates respective data fields for storing an identifier 52-$n$ of the electronic device and/or a configurable component thereof, a hardware-firmware compatibility level (HFCL) 54-$n$, a hardware-software compatibility level (HSCL) 56-$n$, and an indication 58-$n$, such as an identifier and/or version number, of configuration information to be used to configure the device or component.

In one embodiment, the compatibility information 42 also includes an indication of a version of the matrix, illustratively in the form of an indication of a version or release of an electronic device or the data file which includes the compatibility information.

The component/device identifier 52-$n$ may include an identifier of the electronic device, a particular component of an electronic device, or both. Any components identified at 52-$n$ are preferably only those components which affect the firmware or software which is to be used for configuration. For example, the identifier at 52-$n$ may indicate a hardware component of a particular release of a circuit card. In the case of a "cut and strap" or other revision to the card itself, as opposed to the addition of new components to the card or a change of components used on the card, the identifier at 52-$n$ may be an identifier of the card instead of a particular component thereof.

For each identifier 52-$n$, the corresponding HFCL 54-$n$ and HSCL 56-$n$ provide information about firmware and software compatibility. The HFCL 54-$n$ may identify a release level of firmware which is compatible with a particular component or version of hardware, for example. In one embodiment, an integer is used as a value to track release levels. Whereas an initial hardware release may have an HFCL value of "1", the HFCL value is preferably incremented for subsequent hardware revisions which require new or modified firmware.

The HSCL 56-$n$ similarly indicates compatibility levels for particular versions of software. However, it should be appreciated that hardware-firmware compatibility is generally independent of hardware-software compatibility. Accordingly, the HFCL and HSCL values at 54-$n$ and 56-$n$ of a record 46 might not necessarily correlate to each other for a given component or electronic device identified at 52-$n$.

At 58-$n$, particular configuration information may be identified by file name and version number, for example. The configuration information identified at 58-$n$ may be new firmware, software, or some combination thereof. Where a hardware revision affects multiple firmware or software elements, multiple identifiers may be provided at 58-1. Alternatively, separate records may be included in the compatibility information 42 for new firmware or software elements affected by the same hardware component, where these elements have different version numbers for instance.

A compatibility table or matrix as shown in FIG. 2 represents one possible data structure using which a configuration information loader may determine the particular configuration information which may be used to configure an electronic device. According to another aspect of the invention, the compatibility information 42 is also used to determine whether other configuration information capable of configuring the electronic device is available.

As described above, the HFCL and HSCL values 54-$n$ and 56-$n$ indicate the oldest versions of firmware and software, respectively, which are compatible with current hardware. Thus, by determining a version of firmware and software provided in available application loads, a loader may determine whether firmware and software from an application load may be used instead of hardware-bundled firmware and software. This type of determination may also or instead be made on the basis of the information provided at 58-$n$, filenames for instance.

According to some embodiments of the invention, multiple compatibility matrices are accessed to determine the particular configuration information which is to be used in configuring an electronic device. Co-pending U.S. patent application Ser. No. 10/252,703, referenced above, describes techniques for managing configurable elements in a device using a compatibility matrix which includes component/device identifiers, HFCLs, HSCLs, firmware and software identifiers, and other data fields. Whereas the data structure 40 described above includes compatibility information 42 associated with hardware-bundled configuration information, the compatibility matrix described in the co-pending '703 application is associated with available application loads.

As described above, an application load may include configuration information, illustratively firmware and software, which can properly configure an electronic device. This may be the case, for example, when a new application load is released after a hardware revision and incorporates upgraded firmware and/or software. As this new application load would also include more recent compatibility information than previously released hardware, a configuration information loader may determine the appropriate configuration information to be loaded by comparing versions of the hardware-bundled compatibility information and the compatibility information of the application load. Where the application load includes the more recent version of the compatibility information, then configuration information from the application load may be used to configure the electronic device, as disclosed in the co-pending '703 application.

If the compatibility information provided with the hardware is the more recent version, however, then at least some components of the electronic device should be configured using hardware-bundled configuration information.

It will be apparent to those skilled in the art that a hardware revision might not affect all configurable components of an electronic device. For example, although a new FPGA might require new firmware, other components might be configurable using firmware from an application load. In general, it may be desirable to provide a single loader for configuring an electronic device using configuration information from multiple sources, including an application load and a memory in which configuration information was stored during device manufacturing.

One single-loader mechanism for embodiments in which multiple sets of compatibility information are provided involves merging compatibility information when the compatibility information provided with hardware is newer than the compatibility information provided in an application load, with the hardware-bundled compatibility information taking precedence in the event of any configuration information conflicts. The merging of compatibility information may be performed by the configuration information loader itself, or by another component of an electronic device. Merged compatibility information indicates the configuration information to be loaded for all configurable hardware components of an electronic device, not just those affected by hardware changes, and can be used by a single configuration information loader to suitably configure the electronic device.

Once the particular configuration information to be used in configuring an electronic device has been determined, the loader then locates and loads the required configuration information, which may be stored as part of an application load or separately.

The configuration information 44 in the data structure 40 facilitates searching of hardware-bundled configuration information. As shown, the configuration information 44 includes a partition table 62 and a Flash image 64. The partition table 62 includes data fields for storing a tag 72, a version 74, and start and end offsets 76 for each Flash partition. The Flash image 64 similarly includes tag and version fields 82, 84, and M Flash files 86, 88, each of which includes tag, version, filename, file size, integrity information, and data fields, designated 92-1, 94-1, 96-1, 97-1, 98-1, 99-1 for a representative example Flash file #1.

The partition table 62 is used to describe where sections of Flash which make up a configuration information store are located. The tag 72 is a predetermined number or other identifier used to validate that the partition table is being accessed, the version 74 is a number or other identifier used to determine if the partition table 62 is compatible with the current software, and the offsets 76 provide start and end offsets from a Flash base address for each partition. As described above with reference to a predetermined storage location indicated in the SEEP 34 (FIG. 1), offsets may be preferred over absolute addresses in order to accommodate memory map changes.

The Flash image 64 may, for example, be a contiguous file which is distributed across multiple Flash partitions and subsequently reconstructed during electronic device configuration. The Flash image tag 82 and version 84 are used in a substantially similar manner as the tag 72 and the version 74, but for the Flash image 62. Configuration information which may eventually be loaded by a loader is stored in the Flash image 64 in the form of M Flash files, two of which are designated 86, 88.

Each of the M Flash files 86, 88 encapsulates a data file which may be used to configure an electronic device. Header information in a Flash file may include any or all of the fields 92-1, 94-1, 96-1, 97-1, 98-1. The tag and version fields 92-1, 94-1 are used for a Flash file for similar purposes as the tag and version fields of the partition table 62 and the Flash image 64. The filename 96-1, and possibly also the version information 94-1, are specified in the compatibility information 42 at 58-1 and used by a loader to search for required configuration information. The Flash file data size 97-1 specifies a size of the Flash file in bytes, for example. Cyclic Redundancy Check (CRC) or other integrity information may be included in Flash files for use in detecting file corruption.

The actual Flash file data 99-1 contains a file for a configuration information loader. For example, the data section 99-1 might contain a Serial Vector Format (SVF) file for PLD programming.

An illustrative example may serve to clarify various aspects of the invention described above. The following example highlights the capability of loading different FPGA (firmware) loads on different versions of hardware.

Consider the case where there are the following two versions of hardware:
  v1 Hardware with FPGA_A from manufacturer A; and
  v2 Hardware with FPGA_B from manufacturer B, with a bundled version B_v1 of programming for the FPGA_B, and the following two application loads:
  L1—Release 3.0 software, containing a version A_v1 of programming for the FPGA_A; and
  L2—Release 5.0 software, containing the versions A_v4 and B_v2 of programming for FPGA_A and FPGA_B, respectively.

When a customer is using the L1 application load, the loader programs the two versions of hardware as follows:
  v1 Hardware—A_v1 programming from L1 is used; and
  v2 Hardware—B_v1 programming bundled with the hardware is used.

For a customer is using the L2 application load, however, the two versions of hardware are programmed as follows:
  v1 Hardware—A_v4 programming from L2 is used; and
  v2 Hardware—B_v2 programming from L2 is used.

The preceding example demonstrates several capabilities of embodiments of the invention. In particular, new functionality and bug fixes can be added in the latest application load, overriding configuration information bundled with hardware. Embodiments of the invention thereby do not preclude electronic device configuration and application loading according to known techniques where an application load includes configuration information which can suitably configure the electronic device.

Although the v2 Hardware is configured differently by the different application loads in the above example, bundling new B_v3 FPGA programming with the v2 Hardware would cause all application loads shipped to the field to use the specific B_v3 FPGA programming. This may allow hardware fixes to be more easily be shipped from the factory.

It should also be noted that the configuration information bundled with the v2 Hardware in the above example includes only the programming for the FPGA_B, which was not contained in the older L1 application load. Thus, programming and other configuration information which is incorporated into application loads already in the field need not be stored in memory in a new hardware version, thereby saving storage space.

Figure 3:
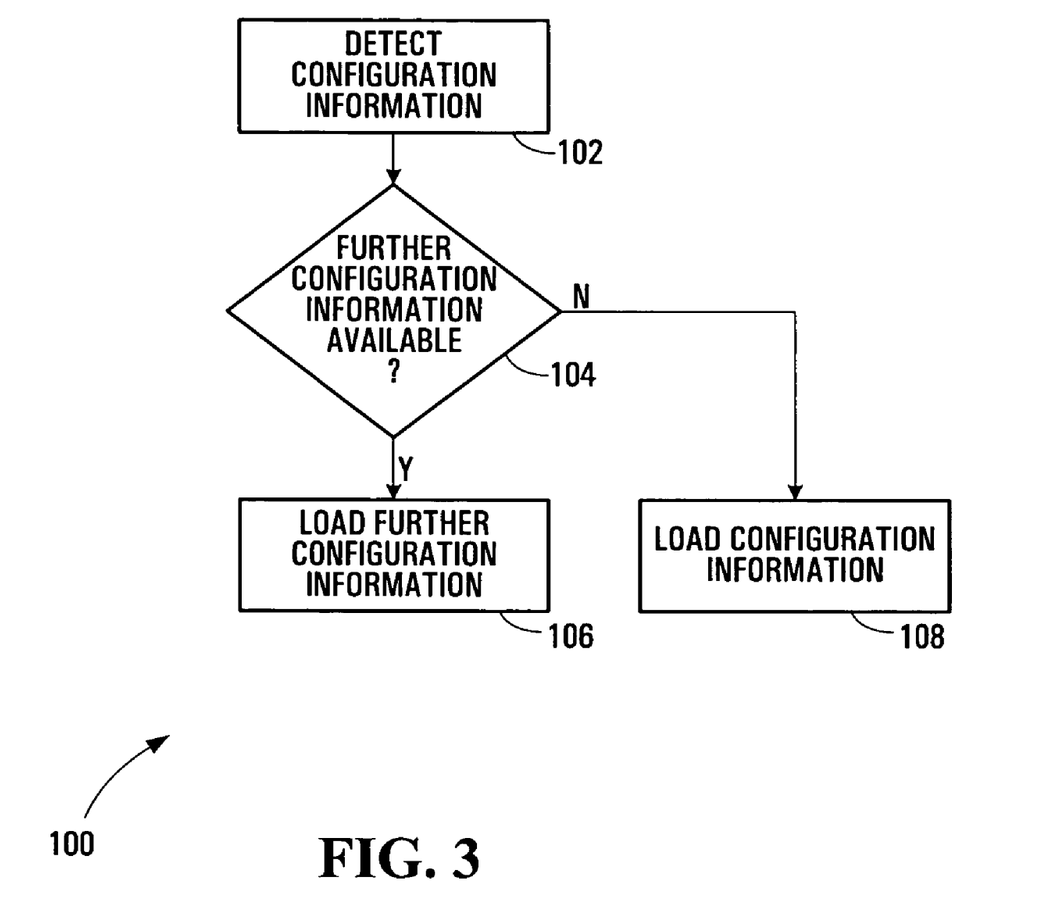
FIG. 3 is a flow diagram illustrating a method according to a further embodiment of the invention.

Embodiments of the invention have been described above primarily in the context of apparatus or systems. FIG. 3 is a flow diagram illustrating a method according to a further embodiment of the invention.

The method 100 begins at 102 with an operation of detecting configuration information, stored in a memory, for configuring at least one component of an electronic device. The configuration information may be stored, for example, in a particular area of Flash.

At 106, a determination is made as to whether further configuration information capable of configuring the component is available at the electronic device. In one embodiment, the further configuration information is software or firmware in an application load.

If further configuration information is not available at the electronic device for configuring the component in question, illustratively a new FPGA or other programmable component incorporated into a new version of the electronic device, the stored configuration information is loaded at 108 to thereby configure the component. Otherwise, the component is configured by loading the further configuration information at 106.

Referring again to the above example of v1 and v2 Hardware and application loads L1 and L2, configuration of the v2 Hardware using L1 is illustrative of the steps 102, 104, and 108, whereas configuring the v2 Hardware using L2 is illustrative of the steps 102, 104, and 106.

The flow diagram of FIG. 3 is intended solely for illustrative purposes. Other embodiments of the invention may include further, fewer, or different steps than those shown in FIG. 3. For example, different ways of performing the operations shown in FIG. 3, as well as various additional operations, will be apparent from the foregoing description of FIGS. 1 and 2.

Figure 4:
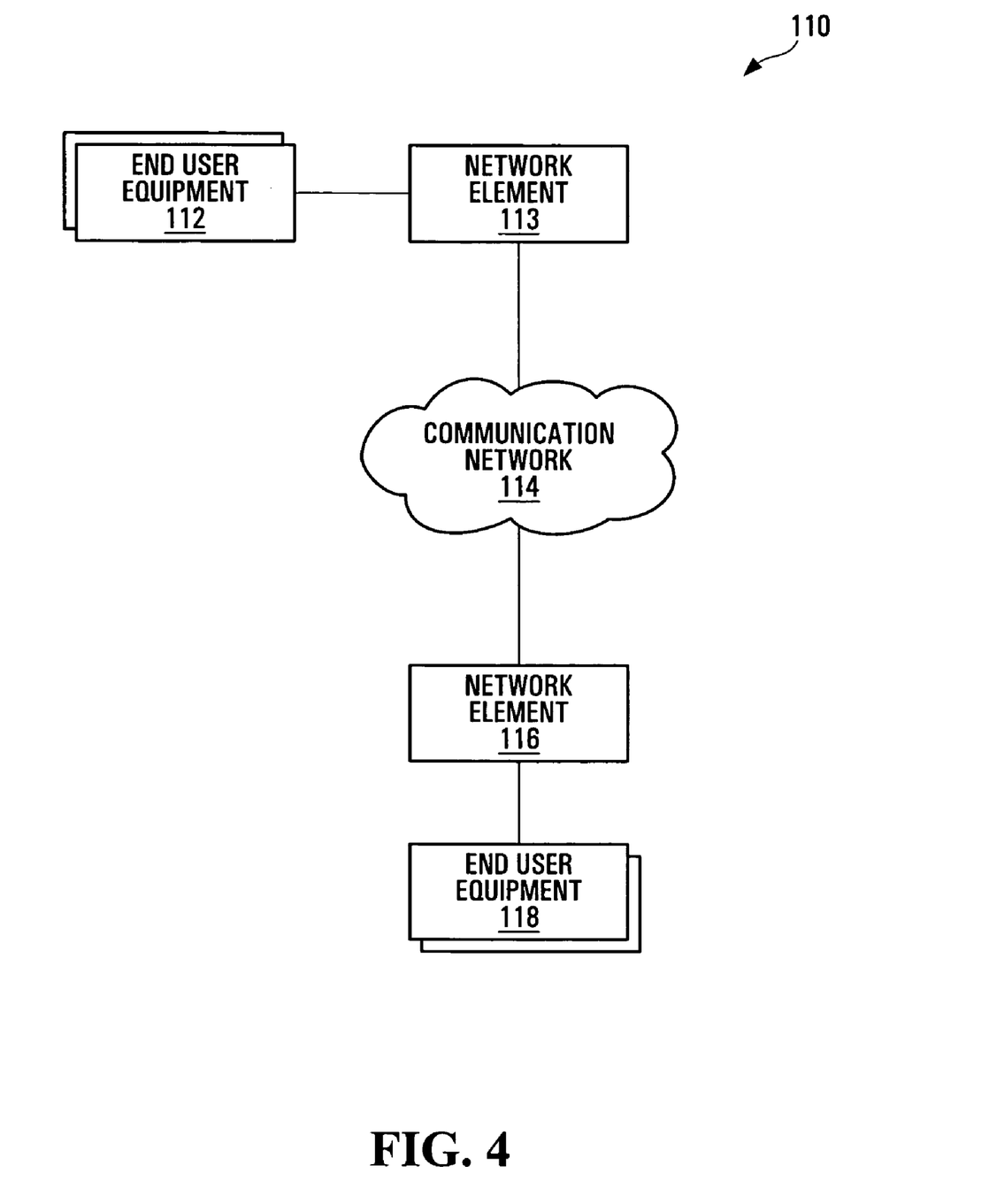
FIG. 4 is a block diagram of a communication system in which embodiments of the invention may be implemented.

Having described aspects of the invention in detail above, it may be useful to consider an example of electronic devices and systems in which embodiments of the invention may be implemented. FIG. 4 is a block diagram of one such system, in particular a communication system.

The communication system 110 in FIG. 4 includes end user communication equipment 112, 118, network elements 113, 116, and a communication network 114. Although many installations of end user equipment 112, 118 and network elements 113, 116 may be connected to the communication network 114, only two examples of each of these components have been labelled in FIG. 4 to avoid congestion.

The end user equipment 112, 118 represents communication equipment which is configured to generate and transmit and/or receive and terminate communication traffic. Although shown as being directly connected to the network elements 113, 116, it will be apparent that end user equipment 112, 118 may communicate with the network elements 113, 116 through other intermediate components (not shown).

Switches and routers are illustrative of the types of communication equipment represented by the network elements 113, 116. The network elements 113, 116 provide access to the communication network 114 and thus have been shown separately in FIG. 4 for illustrative purposes.

The communication network 114, in addition to the border or edge network elements 113, 116, may also include intermediate network elements which route communication traffic through the communication network 114.

Many different types of end user, intermediate, and network communication equipment, as well as the operation thereof, will be apparent to those skilled in the art. In general, communication traffic originating with end user equipment 112, 118, and possibly other sources of communication traffic, for transfer to a remote destination through the communication network 114 is received by a network element 113, 116, translated between different protocols or formats if necessary, and routed through the communication network 114.

One common type of installation for communication network equipment such as the network elements 113, 116 includes an equipment rack having multiple slots. Line cards in one or more slots provide interfaces to communication media. The operation of a line card is typically controlled by distributing an application load and initiating execution of an application, and accordingly line cards represent one type of electronic device in conjunction with which the configuration management techniques disclosed herein may be implemented.

It should be appreciated that the invention may be implemented in other types of electronic device and system than line cards in communication equipment. End user equipment 112, 118, for example, may include configurable components. Electronic devices which are intended for other primary purposes than communications may also benefit from configuration management as disclosed herein. Embodiments of the invention may be applied to virtually any type of electronic device having one or more configurable components.

As will be apparent from the foregoing, embodiments of the invention may be used to automatically keep electronic devices and equipment in which they are implemented running the latest compatible versions of firmware and/or software. Customers need not have knowledge of the complexities of maintaining device configurations, or manually manage compatibility issues, which may reduce the maintenance costs and complexity of maintaining equipment in the field.

Embodiments of the invention also provide a flexible mechanism of allowing upgrade strategies to evolve, without requiring immediate hardware changes. For example, suppose existing hardware A is to be modified to hardware B to achieve a cost reduction, but in the process of revising hardware from A to B, intermediate hardware variants C, D, and E are created and shipped. The techniques disclosed herein allow each hardware variant, as well as the ultimate final version B, to be appropriately configured.

It is also possible that existing hardware does not have unused Flash for storing configuration information. In this case, hardware and software may be shipped using a conventional strategy, requiring new software loads when new firmware or hardware is available. As new hardware having sufficient unused Flash for storing configuration information is deployed, the techniques disclosed herein may be used to allow hardware to be changed without requiring new software loads, thus evolving the upgrade strategy.

According to another possible upgrade strategy, a determination as to whether a new loader and new configuration information is present is made by looking for pointers in memory, in a SEEP for instance. Provided a memory map otherwise remains substantially the same, and no pointers exist, then an old loader may be used to configure an electronic device. Otherwise, a pointer to a new loader in Flash is used to locate the new loader, which is then used for device configuration. This allows software supporting a new loader to be shipped without having to make any immediate changes to hardware. When new hardware having Flash for storing a new loader and configuration information is available, the new loader is automatically loaded and used to configure the device.

By ensuring that hardware-specific configuration information, illustratively software and firmware patches, can be applied by older versions of application software, older applications can be run on new hardware, again reducing end customer maintenance and upgrade costs. Software and/or firmware changes can be applied to the hardware by a loader in an application load, such that the actual application software need not change with new hardware.

Hardware manufacturers are thereby provided with an improved mechanism for dealing with typical product life cycle issues, such as cost reductions, hardware re-spins, and component obsolescence.

What has been described is merely illustrative of the application of principles of the invention. Other arrangements and methods can be implemented by those skilled in the art without departing from the scope of the present invention.

For example, the invention is in no way restricted to compatibility and configuration information in the formats shown in FIG. 2. If a hardware upgrade affects only firmware for instance, software compatibility information might not be provided. Where configuration information searching is based only on file names, compatibility levels need not be included in compatibility information. Further or different data fields than those shown in FIG. 2 may be used in other embodiments, including any or all of the data fields described in the co-pending '703 application referenced above. Other variations of the example data structure, as well as alternative data structures, will be apparent to those skilled in the art.

In addition, although described primarily in the context of methods and systems, other implementations of the invention are also contemplated, as instructions stored on a machine-readable medium, for example.

We claim:

1. Apparatus for managing configuration of an electronic device, the apparatus comprising:
a configuration information loader adapted to access a memory storing configuration information for configuring at least one component of an electronic device and compatibility information providing an indication of configuration information that is capable of configuring the at least one component, to determine whether configuration information indicated in the compatibility information is available at the electronic device, and to load either the configuration information from the memory or the configuration information that is available at the electronic device, based on the determination, to configure the at least one component.

2. The apparatus of claim 1, wherein the configuration information loader is implemented in software for execution by a processor.

3. The apparatus of claim 1, wherein the compatibility information identifies a version of the configuration information that is capable of configuring the at least one component, and wherein the configuration information loader determines whether the configuration information indicated in the compatibility information is available at the electronic device by determining whether the identified version or a higher version of the configuration information is available at the electronic device.

4. The apparatus of claim 3, wherein the configuration information loader is further adapted to access a predetermined storage location of either the memory or a further memory, the predetermined storage location storing an indication of a storage location in the memory at which the configuration information and the compatibility information are stored.

5. The apparatus of claim 1, wherein the configuration information comprises at least one of firmware and software.

6. The apparatus of claim 1, wherein the configuration information loader is adapted to load the configuration information from the memory where the configuration information indicated in the compatibility information is not available at the electronic device, and to load the configuration information that is available at the electronic device where the configuration information indicated in the compatibility information is available at the electronic device.

7. The apparatus of claim 1, wherein the configuration information comprises at least one of firmware and software bundled with hardware of the electronic device, and wherein the configuration information loader determines whether the configuration information indicated in the compatibility information is available at the electronic device by identifying any application loads which are available at the electronic device, each application load comprising software and firmware.

8. The apparatus of claim 1, wherein the configuration information loader further determines whether configuration information capable of configuring the at least one component is available at the electronic device by comparing a version of the compatibility information stored in the memory with a version of compatibility information associated with configuration information that is available at the electronic device.

9. The apparatus of claim 1, implemented in an electronic circuit card of communication equipment, the communication equipment further comprising:
respective memory areas for storing (i) the configuration information and the compatibility information and (ii) an application load comprising further configuration information.

10. The apparatus of claim 1, wherein the compatibility information further provides respective identifiers of each of the at least one component, and wherein the indication comprises respective indications of configuration information that is capable of configuring each of the at least one component.

11. A method of managing configuration of an electronic device, the method comprising:
detecting in a memory configuration information, for configuring at least one component of the electronic device, and compatibility information, providing an indication of configuration information that is capable of configuring the at least one component;
determining whether configuration information indicated in the compatibility information is available at the electronic device; and
loading either the configuration information from the memory or the configuration information that is available at the electronic device, based on the determining, to configure the at least one component.

12. The method of claim 11, wherein the compatibility information, identifies a version of the configuration information that is capable of configuring the at least one component, and wherein determining comprises determining whether the identified version or a higher version of the configuration information is available at the electronic device.

13. The method of claim 12, wherein detecting further comprises accessing a predetermined storage location of either the memory or a further memory, the predetermined storage location storing an indication of a storage location in the memory at which the configuration information and the compatibility information are stored.

14. The method of claim 11, wherein:
detecting comprises determining a version of the compatibility information stored in the memory; and
the method further comprises comparing the version of the compatibility information stored in the memory with a version of compatibility information associated with configuration information that is available at the electronic device.

15. The method of claim 11, wherein loading comprises loading the configuration information that is available at the electronic device where the configuration information indicated in the compatibility information is available at the electronic device.

16. The method of claim 11, wherein the configuration information comprises at least one of firmware and software bundled with hardware of the electronic device, and wherein determining comprises identifying any application loads which are available at the electronic device, each application load comprising software and firmware.

17. The method of claim 11, wherein the compatibility information further provides respective identifiers of each of the at least one component, and wherein the indication comprises respective indications of configuration information that is capable of configuring each of the at least one component.

* * * * *